United States Patent [19]
Takeshita et al.

[11] Patent Number: 5,253,119
[45] Date of Patent: Oct. 12, 1993

[54] DIGITAL IMAGE REPRODUCTION APPARATUS AND METHOD

[75] Inventors: Kazuyuki Takeshita, Hachioji; Kenji Nakano, Fuchu, both of Japan

[73] Assignee: Hitachi, Ltd., Tokyo, Japan

[21] Appl. No.: 545,639

[22] Filed: Jun. 29, 1990

[30] Foreign Application Priority Data

Jul. 3, 1989 [JP] Japan ............................ 1-169979

[51] Int. Cl.⁵ ............................................. H04N 5/78
[52] U.S. Cl. ..................................... 360/10.3; 360/48; 360/49
[58] Field of Search .................. 360/10.3, 10.1, 35, 360/33.1, 14.1, 9.1, 11.1, 48, 49; 358/311, 312, 313; 395/164-166

[56] References Cited

U.S. PATENT DOCUMENTS

| | | | |
|---|---|---|---|
| 4,768,102 | 8/1988 | O'Gwynn | 358/324 |
| 4,905,099 | 2/1990 | Mester et al. | 360/10.1 |
| 4,939,593 | 7/1990 | Yuuchi et al. | 360/11.1 |

Primary Examiner—Aristotelis Psitos
Assistant Examiner—Y. Sheladia
Attorney, Agent, or Firm—Antonelli, Terry, Stout & Kraus

[57] ABSTRACT

The present invention includes reproducing digital image signals recorded on magnetic tape, discriminating a field or frame whereto the signals reproduced from the magnetic tape belong, selecting either of alternate fields or frames of the digital image signals and remaining alternate fields or frames on the basis of result of the discrimination, and writing only the reproduced signals belonging to the selected fields or frames into a specified writing area of the memory.

5 Claims, 3 Drawing Sheets

FIG. 3
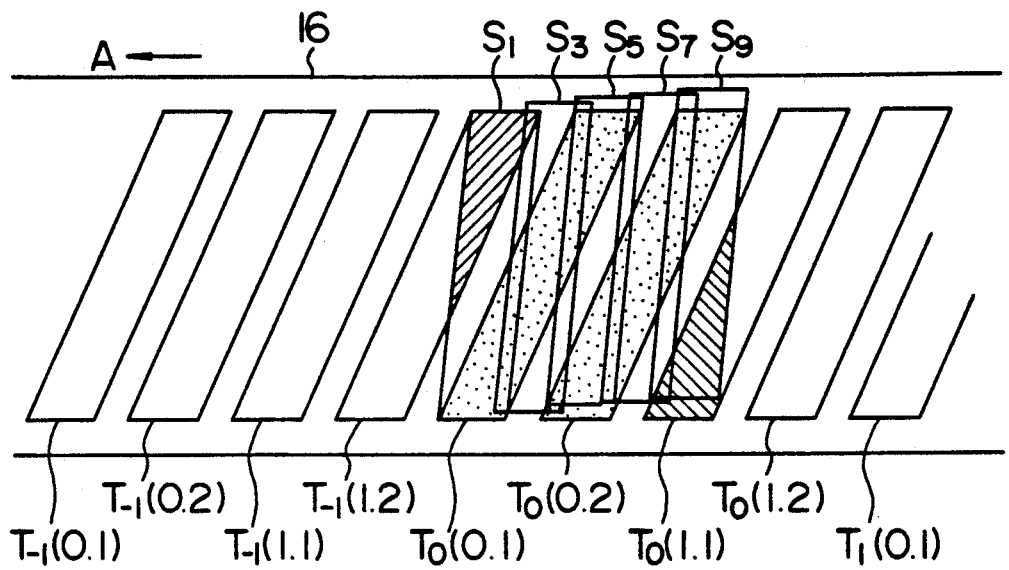
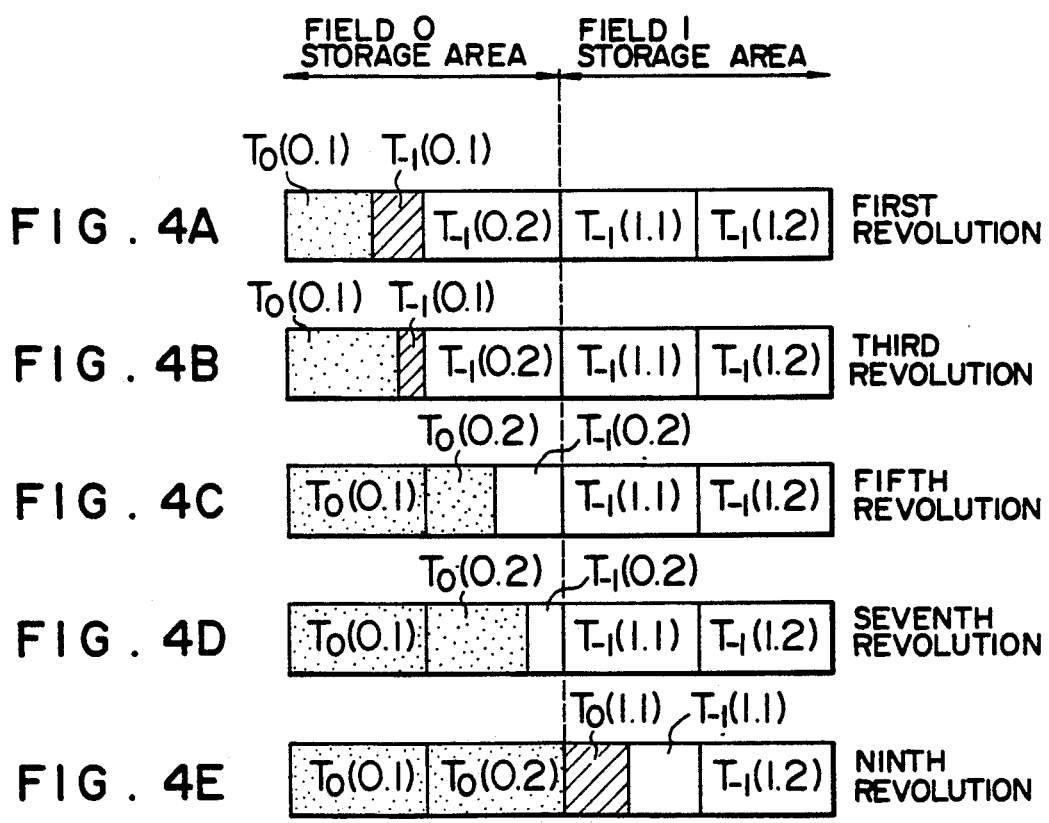

DIGITAL IMAGE REPRODUCTION APPARATUS AND METHOD

BACKGROUND OF THE INVENTION

The present invention relates to a digital VTR, and in particular to a digital image reproduction apparatus and method for performing slow-motion reproduction (hereafter abbreviated to slow reproduction) by using a memory.

In a digital VTR, image signals are so recorded on magnetic tape that each field may be divided to a plurality of tracks. When slow reproduction is to be performed by using magnetic tape having image signals thus recorded thereon, image signals reproduced when the magnetic tape is traveling at low speed are written into a memory having a capacity of one field or one frame, and the image signals thus written are then read out.

The operation for writing the reproduced image signals into the memory at the time of slow reproduction will now be described. That is to say, image signals comprise a train of data in unit intervals (hereafter referred to as blocks) such as horizontal intervals. An ID signal comprising data (field ID) representing a field No. to which the block belongs and block No. is added to each block. The reproduced video signals undergo processing, such as error detection and error correction, on a block by block basis. Blocks free from error are written into addresses of the memory corresponding to the ID signals.

Only blocks of the reproduced video signals free from error are thus stored into the memory. Therefore, slow images reproduced and displayed on the basis of image signals read out from this memory become favorable.

By taking slow reproduction with a quarter speed as an example, such slow reproduction of a digital VTR using a frame memory will now be described concretely with reference to FIGS. 3 and 4. However, it is now assumed that each field of the image signals is so recorded on the magnetic tape as to be divided into two tracks. Therefore, image signals of half a field are recorded onto each track. Such a recording apparatus and method is referred to as a two-segment recording apparatus and method. The recording interval of each field is equivalent to an interval during which a rotary drum having a head mounted thereon makes two revolutions.

FIG. 3 shows a track pattern on a magnetic tape in a digital VTR and scanning trace of the reproduction head at the time of slow reproduction.

Assuming now in FIG. 3 that a certain frame of image signals (hereafter referred to as a frame of interest) is frame 0, its immediately preceding frame is referred to as the preceding frame and is represented as frame (−1), whereas its immediately succeeding frame is referred to as the succeeding frame and is represented as frame 1. Further, one frame comprises two fields. The preceding one of the two fields is referred to as field 0, and the succeeding one of the two fields is referred to as field 1.

Image signals of the preceding frame (−1) are recorded beforehand onto tracks $T_{-1}(0.1)$ to $T_{-1}(1.2)$. The former half of the field 0 of that frame is recorded beforehand onto the track $T_{-1}(0.1)$. Its latter half is recorded beforehand onto track $T_{-1}(0.2)$. The former half of field 1 of that frame is recorded beforehand onto track $T_{-1}(1.1)$, whereas its latter half is recorded beforehand onto track $T_{-1}(1.2)$. In the same way, image signals of frame 0 of interest are recorded beforehand onto four tracks $T_0(0.1)$ to $T_0(1\ 2)$. Field 0 of the frame 0 is recorded beforehand onto two preceding tracks $T_0(0.1)$ and $T_0(0.2)$, and field 1 of the frame 0 is recorded beforehand onto two succeeding tracks $T_0(1.1)$ and $T_0(1.2)$. Further, the former half of field 0 of the succeeding frame 1 is recorded beforehand onto track $T_1(0.1)$.

In case of slow reproduction, the traveling speed of magnetic tape is different from that of normal recording on reproduction, as described above. Accordingly, the scanning trace of the reproduction head is inclined with respect to the recorded tracks. In some cases, therefore, the scanning trace extends over two adjacent tracks.

FIG. 3 shows scanning traces $S_1$, $S_3$, $S_5$, $S_7$ and $S_9$ obtained in slow reproduction with a quarter speed when the reproduction head scans the tracks $T_0(0.1)$ to $T_0(1.2)$ having image signals of the frame 0 of interest recorded thereon. The scanning trace $S_1$ is a scanning trace for the frame 0 of interest in the first revolution of the rotary drum. The scanning traces $S_3$, $S_5$ and $S_7$ are scanning traces respectively in the third, fifth and seventh revolutions. Scanning traces in even-numbered revolutions are omitted for the sake of clarity.

It is now assumed that magnetic tape 16 travels at a speed equivalent to a quarter of that of normal reproduction in a direction indicated by an arrow A. In reproduction of image signals of this frame 0 of interest, the former half of the scanning trace $S_1$ caused by the first revolution of the rotary drum lies upon the track $T_0(0.1)$ whereas the latter half of the scanning trace $S_1$ lies upon the track $T_{-1}(1.2)$. As the second revolution, the third revolution and so on are made, the scanning trace moves successively to the upper right on the magnetic tape 16 as represented by $S_3$, $S_5$, $S_7$, $S_9$, --- as a result of traveling of the magnetic tape 16 in the direction indicated by the arrow A. In the first revolution of the rotary drum, therefore, the track $T_0(0.1)$ of the frame 0 of interest and a shaded region of the last track $T_{-1}(1.2)$ of the preceding frame (−1) are scanned for reproduction. As the second revolution and then the third revolution are made thereafter, a portion of the track $T_{-1}(1.2)$ reproduced and scanned successively decreases. In the fourth revolution, the track $T_{-1}(1.2)$ is not scanned for reproduction. Instead, the tracks $T_0(0.1)$ and $T_0(0.2)$ are scanned for reproduction. Further, commencing with the eighth revolution, the track $T_0(1.1)$ having the former half of the preceding field 0 in the frame 0 of interest recorded thereon is scanned for reproduction. Sixteen revolutions of the rotary drum results in reproduction of one frame.

In the former half of the scanning trace $S_1$, therefore, image signals are reproduced from the track $T_0(0.1)$. In the latter half of the scanning trace $S_1$, image signals are reproduced from the track $T_{-1}(1.2)$. As the scanning trace advances from $S_1$ successively to $S_2$, $S_3$ and so on, however, the interval during which image signals are reproduced from the track $T_{-1}(1.2)$ becomes shorter. Commencing with scanning trace $S_4$, the track $T_0(0.2)$ is scanned for reproduction instead. In the scanning traces $S_1$ to $S_4$, the whole of the track $T_0(0.1)$ is scanned for reproduction. In scanning traces $S_5$ to $S_8$, the whole of the track $T_0(0.2)$ is scanned for reproduction. Commencing with the scanning trace $S_8$, the track $T_0(1\ 1)$ is scanned for reproduction.

In case of slow reproduction with a quarter speed, image signals of one field are thus reproduced by performing scanning for reproduction eight times. Image signals of one frame are reproduced by performing scanning for reproduction sixteen times.

With regard to slow reproduction shown in FIG. 3, writing digital reproduced image signals into the frame memory will now be described by referring to FIGS. 4A to 4E.

FIGS. 4A to 4E show storage contents of the frame memory obtained when the rotary drum has made an odd number of revolutions. In order to indicate from which track shown in FIG. 3 the storage contents have been reproduced, each of the storage contents is provided with a call out given to each track of FIG. 3.

In the frame memory, storage areas of fields 0 and 1 are predetermined. In each field, blocks reproduced from the magnetic tape 16 are stored into their pertinent storage areas in order of reproduction. The storage areas respectively allocated in the frame memory to the fields 0 and 1 are referred to as field 0 storage area and field 1 storage area, respectively.

First of all, the scanning trace which immediately precedes the scanning trace $S_1$ shown in FIG. 3 and which is not illustrated will now be described. Although not illustrated in FIGS. 4A to 4E, image signals reproduced from the track $T_{-1}(0.1)$ are stored into former half of the field 0 storage area of the frame memory, and image signals reproduced from the track $T_{-1}(0.2)$ are stored into latter half of the field 0 storage area. Image signals reproduced from the track $T_{-1}(1.1)$ are stored into former half of the field 1 storage area, and image signals reproduced from the track $T_{-1}(1.2)$ are stored into latter half of the field 1 storage area.

Under such a storage state in the frame memory, the first revolution of the rotary drum in the frame 0 of interest causing the scanning trace $S_1$ is started. In the nearly former half of the track $T_0(0\ 1)$, signal reproduction is thus performed. As shown in FIG. 4A, the resultant image signals are written into an area nearly equivalent to a quarter of the field 0 storage area in the frame memory beginning with the start address of the field 0 storage area. In nearly the latter half of the scanning trace $S_1$, signals are reproduced from nearly the latter half (shaded portion) of the track $T_{-1}(1.2)$. As shown in FIG. 4A, the resultant reproduced video signals are written into the last portion of the field 1 storage area in the frame memory nearly occupying a quarter of the field 1 storage area. In this portion, image signals having the same contents as those of image signals already stored are written. As a result, its storage contents are not changed.

If with reference to FIG. 3 reproduction scanning along the scanning traces $S_2$ (not illustrated) and $S_3$ is performed by the second revolution and the third revolution of the rotary drum, the reproduction area of the track $T_0(0.1)$ expands. In the frame memory as well, the storage area of image signals reproduced from the track $T_0(0.1)$ expands in the former half of the field 0 storage area as shown in FIG. 4B. Consequently, the reproduction area of the track $T_{-1}(1.2)$ of the preceding frame $(-1)$ decreases. The above described writing range in the field 1 storage area of the frame memory decreases.

In the same way, the track $T_0(0.2)$ also begins to be scanned for reproduction as a result of travel of the magnetic tape 16. In the fifth revolution of the rotary drum, image signals reproduced from the whole of the track $T_0(0.1)$ are stored into the former half of the field 0 storage area in the frame memory, and image signals reproduced from the former half of the track $T_0(0.2)$ are stored into an area occupying nearly a quarter of the latter half of the field storage area as shown in FIG. 4C. In the seventh revolution of the rotary drum, the reproduction area in the track $T_0(0\ 2)$ expands, and the storage area of image signals reproduced from this track $T_0(0.2)$ thus expands in the field 0 storage area of the frame memory as shown in FIG. 4D. In the eighth and ninth revolutions of the rotary drum, image signals reproduced from the whole of the tracks $T_0(0.1)$ and $T_0(0.2)$ are written into the field 0 storage area of the frame memory, and image signals of the field 1 reproduced from the track $T_0(1.1)$ are written into the field 1 storage area of the frame memory as shown in FIG. 4E.

The write address of the reproduced image signals in the frame memory is specified on the basis of the ID signal added to each block.

In the frame memory, the writing operation heretofore described is performed. While this writing operation is performed, however, a reading operation is performed repeatedly.

Reading from the memory is performed alternately in the field 0 storage area and the field 1 storage area. Such slow reproduction image signals in which one frame comprises field 0 and field 1 are thus obtained.

As described above, the interval of two revolutions of the rotary drum is equivalent to one field interval. Therefore, the interval of four revolutions of the rotary drum is equivalent to one frame interval of image signals. In the frame memory in which a writing operation is conducted as shown in FIGS. 4A to 4E, therefore, the rewriting interval of reproduced image signals corresponding to one frame is equivalent to an interval during which the rotary drum makes sixteen revolutions, in case of slow reproduction with a quarter speed. During this interval, therefore, readout of the frame memory is repeated four $(=16 \div 4)$ times and hence image signals of four frames are obtained. That is to say, in an interval during which image signals of one frame are reproduced from the magnetic tape 16, image signals of four frames are obtained from the frame memory, resulting in slow reproduction with a quarter speed.

In some cases of the above described slow reproduction, however, image signals of another frame are simultaneously and mixedly reproduced. If a change is caused in such cases between frames of image signals representing a moving picture by a moving portion of the moving picture, blurring appears in the reproduced images.

It is now assumed that a certain frame begins to be read out in the storage state shown in FIG. 4A from the frame memory into which image signals have been written, as shown in FIGS. 4a to 4E. Image signals of one frame are then read out in the interval of four revolutions of the rotary drum. In the storage state shown in FIG. 4C, therefore, a subsequent frame begins to be read out. In the storage state shown in FIG. 4E, a further subsequent frame begins to be read out.

As for the interval of eight revolutions of the rotary drum shown in FIGS. 4A to 4D, the however, writing operation to the field 0 storage area of the frame memory is conducted in the interval of the first to third revolutions of the rotary drum. In image signals of the field 0 obtained by readout in this interval, field 0 of the frame 0 of interest reproduced from the magnetic tape 16 and field 0 of the preceding frame $(-1)$ which precedes it by one frame are mixedly present. That is to say, if readout of a certain frame is started in the storage state of FIG. 4A and readout of a subsequent frame is started in the storage state of FIG. 4C, the following operation results. In the storage state of FIG. 4a, image signals reproduced from the track $T_{-1}(0.1)$ of the preceding frame ($-1$) shown in FIG. 3 are mixed into field 0 of image signals read out from the field 0 storage area of the frame memory. In the storage state of FIG. 4C, however, image signals reproduced from the track $T_0(0.1)$ of the frame 0 of interest are present on the area, in which image signals reproduced from this track $T_{-1}(0.1)$ of the frame memory were stored before, as a result of a rewriting operation.

Assuming now with regard to slow-reproduction images that images reproduced from the track $T_{-1}(0.1)$ are displayed in field 0 of a certain frame interval of image signals obtained from the frame memory, images reproduced from the track $T_0(0.1)$ are displayed in the same location as that of the foregoing description in the field 0 of a subsequent frame interval.

There is a time lag equivalent to one frame interval (which is 1/30 second in case of an apparatus and a method of NTSC type) between image contents recorded on the track $T_{-1}(0.1)$ and image contents recorded on the track $T_0(0.1)$. If a moving portion of image causing a lag is included in these image contents, therefore, discrepancy in position and size between images of successive frames displayed on an identical location of the slow-reproduction screen is caused, resulting in blurring. In general, favorable slow-reproduction images are obtained in case of slow reproduction with 1/n times speed (where n is an integer not less than 2) by repeating a frame having identical image contents n times. In the above described case, however, image contents change while the frame is being repeated n times. Discrepancy in position and size is thus caused in displayed images, resulting in blurring.

SUMMARY OF THE INVENTION

An object of the present invention is to provide a digital image reproduction apparatus, and method, solving the above described problems and being capable of preventing blurring in reproduced images and improving the image quality in slow reproduction of a digital VTR.

In order to achieve the above described object, an apparatus according to the present invention comprises a memory having a first storage area corresponding to alternate fields or frames of digital image signals recorded on magnetic tape and a second storage area corresponding to remaining alternate fields or frames, first means for discriminating a field or frame to which signals reproduced from the magnetic tape belongs, second means for selecting either of the alternate fields or frames and the remaining alternate fields or frames on the basis of the discrimination result of the first means, and third means for writing only the reproduced signals belonging to the selected fields or frames into a specified writing area of the memory.

Further, in accordance with the present invention, a storage area, which is included in the first and second storage areas of the above described memory and which is not specified as the writing area by the third means, is used as a reading area.

Since the writing area of the memory is specified by the third means, it has been made clear which of the first and second storage areas of the memory is the writing area. In addition, only reproduced signals belonging to the same field or frame are written into the first or second storage area specified as the writing area. A writing area specification change from the first storage area to the second storage area or from the second storage area to the first storage area is made when reproduced signals corresponding to one field or one frame are written into the above described writing area. Into the first or second storage area, therefore, reproduced image signals of one field or one frame belonging to the same field or frame are written.

In case of reproduction in which the magnetic tape travels at a speed different from that of the recording operation, reproduction scanning is performed over a plurality of tracks. In an interval during which image signals of one field or one frame are reproduced from the above described magnetic tape, therefore, reproduced signals belonging to different fields or frames are mixedly present. In accordance with the present invention, however, only reproduced signals belonging to the selected predetermined field or frame are selected and written into only either of the first and second storage areas of the memory.

Further, it is apparent which of the first and second storage areas of the memory is the writing area as described above. In addition, reproduced image signals of one field or one frame are completely stored in the first or second storage area which is not the writing area. By using this storage area as the reading area, therefore, image signals read out from the memory comprise in the field interval or frame interval, reproduced signals belonging to an identical field or frame on the magnetic tape. It is thus possible to obtain digital image signals which do not cause blurring in the reproduced image. The reading area in the memory can also the specified correctly.

When magnetic tape travels at a speed different from that of the recording operation, the present invention heretofore described makes it possible to write only reproduced signals belonging to a predetermined field or frame selected from the magnetic tape into a memory and write the above described reproduced signals into a storage area of the above described memory corresponding to the above described predetermined field or frame. Into the above described one storage area, the reproduced signals belonging to an identical field or frame are stored. Further, since it is made clear which storage area of the memory is in the writing state, readout can be performed in a storage area for which a writing operation has been surely finished. In each field interval or each frame interval, image signals comprising reproduced signals belonging to an identical field or frame are thus obtained. In this way, it is possible to completely prevent blurring in reproduced images.

BRIEF DESCRIPTION OF THE DRAWINGS

FIG. 3 is a schematic diagram showing a track pattern on magnetic tape in a digital VTR and scanning traces in slow reproduction thereof; and FIGS. 4A to 4E are diagrams showing a temporal change of state of writing signals reproduced from the magnetic tape of FIG. 3 into a frame memory.

DESCRIPTION OF THE PREFERRED EMBODIMENTS

An embodiment of the present invention will hereafter be described by referring to drawings.

Figure 1:
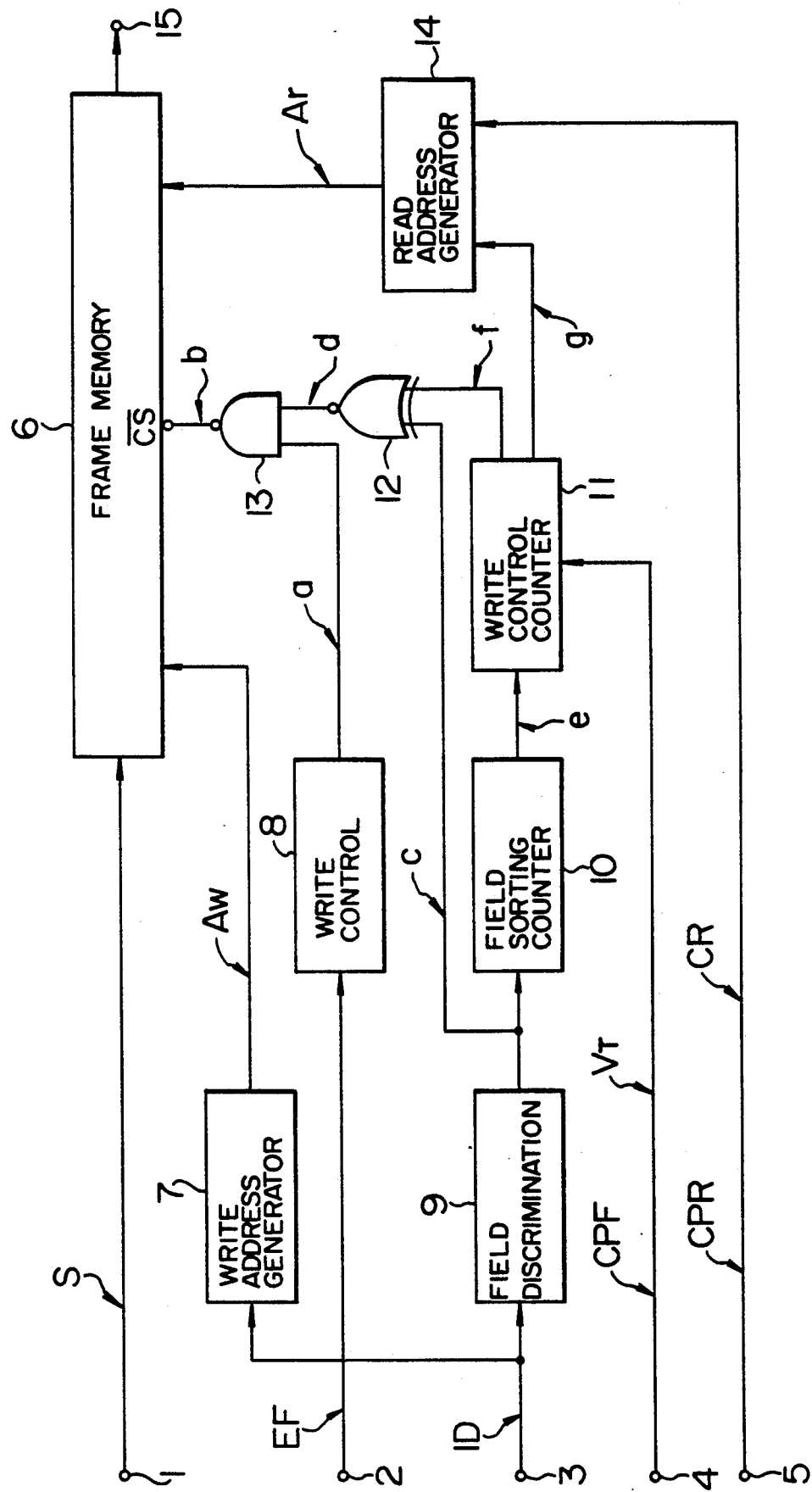
FIG. 1 is a block diagram showing an embodiment of a digital image reproduction apparatus, and method, according to the present invention.

FIG. 1 is a block diagram showing an embodiment of a digital image reproduction apparatus, and method, according to the present invention. Numerals 1 to 5 denote input terminals. Numeral 6 denotes a frame memory, numeral 7 a write address generator, numeral 8 a write control circuit, numeral 9 a field discrimination circuit, numeral 10 a field sorting counter, numeral 11 a write control counter, numeral 12 an exclusive OR counter circuit, numeral 13 a NAND gate, numeral 14 a read address generator, and numeral 15 an output terminal.

With reference to FIG. 1, an image signal S, which has been obtained by applying reproduction processing, such as error detection and correction, to a signal reproduced as shown in FIG. 3, is inputted to the input terminal 1 and supplied to the frame memory 6. Further, this image signal S is divided into blocks (such as horizontal intervals). Each block undergoes error detection and correction, and a field ID is added to each block. Whenever a block which has not undergone error correction is inputted to the input terminal 1, an error flag EF representing this fact is inputted to the input terminal 2. A field ID separated from the reproduced image signal S is inputted to the input terminal 3. The error flag EF is supplied from the input terminal 2 to the write control circuit 8. A write permission signal a generated by the write control circuit 8 becomes "L" (low level) in an interval during which an uncorrectably erroneous block is inputted from the input terminal 1, whereas the write permission signal a becomes "H" (high level) in an interval during which a block free from error or a block which has undergone error correction is inputted from the input terminal 1. This write permission signal a is supplied to the NAND gate 13. When the write permission signal a is "L", the output of the NAND gate 13 is fixed to "H". When this write permission signal a is "H", the NAND gate 13 outputs a chip select signal b which is obtained by applying level inversion to a write gate signal d outputted from the exclusive OR circuit 12.

When an uncorrectably erroneous block is inputted from the input terminal 1, therefore, the error flag EF is inputted from the input terminal 2 and the chip select signal b outputted from the NAND gate 13 is fixed to "H", the frame memory 6 being brought into the write inhibit mode. As a result, only blocks free from error supplied from the input terminal 1 are written into the frame memory 6.

An ID signal including the field ID inputted from the input terminal 3 is supplied to the write address generator 7. A write address Aw indicating the storage location of each block inputted from the input terminal 1 on the frame memory 6 is thus generated.

Figure 2:
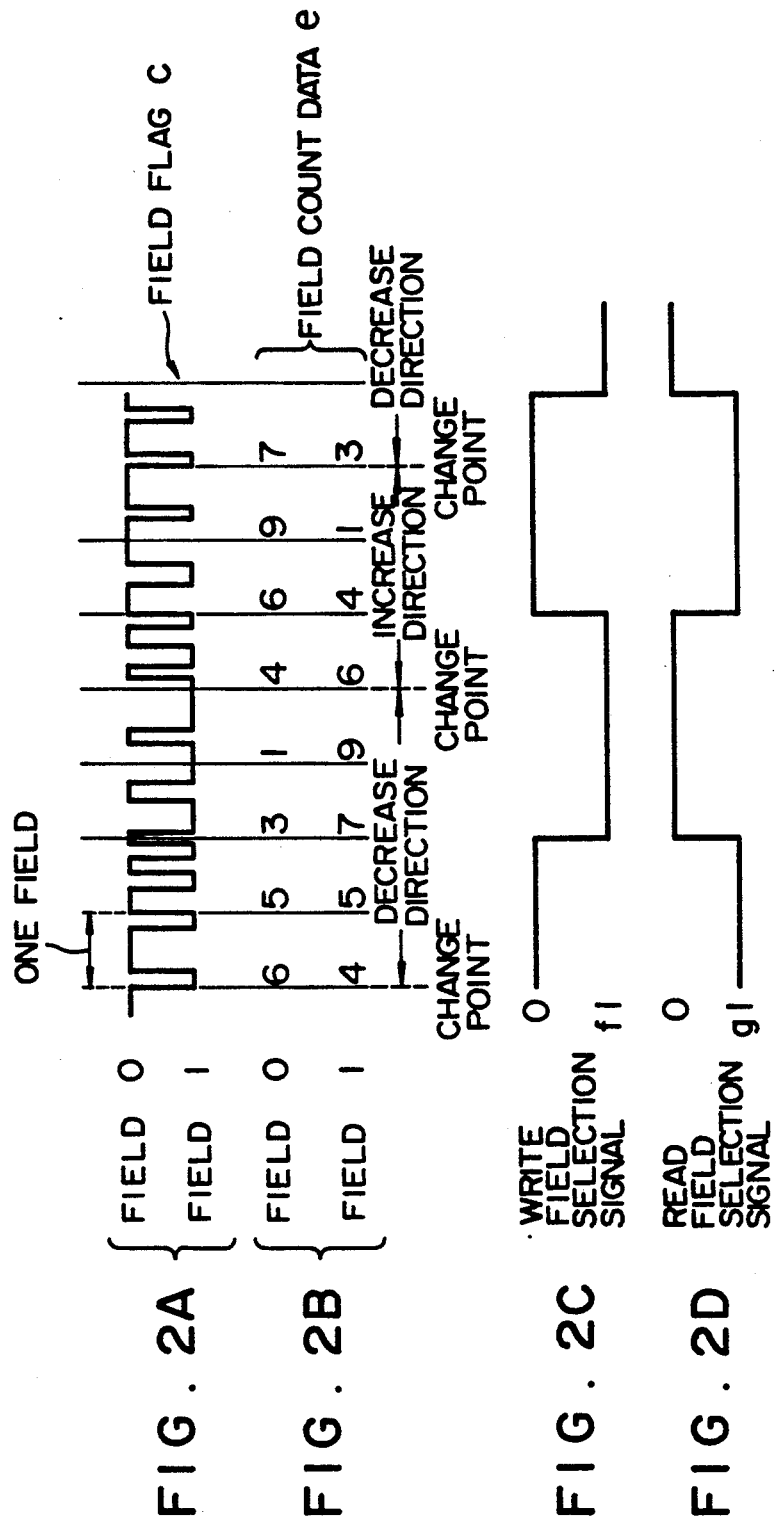
FIGS. 2A to 2D are time charts showing the operation of the embodiment shown in FIG. 1.

Further, the field ID contained in the ID signal inputted from the input terminal 3 is supplied to the field discrimination circuit 9. It is thus judged which of fields 0 and 1 the block inputted from the input terminal 1 belongs to. A field flag c representing the result of this judgment is generated. FIG. 2A shows an example of this field flag c. The level "H" indicates field 0 and the level "L" indicates field 1. This field flag c is supplied to the exclusive OR circuit 12 and the field sorting counter 10.

In the field sorting counter 10, field flags c are sorted by field interval of the reproduced image signal S inputted from the input terminal 1. For each field interval of sorting, field flags c of fields 0 and 1 are counted, respectively. Field count data e representing counts of fields 0 and 1 are generated and supplied to the write control counter 11.

On the basis of the field count data e, the write control counter 11 generates a write field selection signal f and a read field selection signal g which is related by level inversion to the signal f. In response to this write field selection signal f, the block of one of the fields 0 and 1 supplied from the input terminal 1 having a larger number of field flags is written into the frame memory 6 in each field interval.

FIG. 2B schematically shows field count data e in each field interval with respect to the field flag c shown in FIG. 2A. For brevity of description, it is now assumed that the number of field flags c (i.e., the number of blocks) per field interval is 10. It is a matter of course that this number varies depending upon the reproduction tape speed.

Assuming now that the number of field flags c representing field 0 in a certain field interval is 6 and the number of field flags c representing field 1 in that field interval is 4, the write control counter 11 generates the write field selection signal f in this field interval to write only a block included in blocks supplied from the input terminal 1 and belonging to field 0 into the frame memory 6.

Operation of generating the write field selection signal f in the write control counter 11 will hereafter be described.

In case of slow reproduction, the numbers of field flags of fields 0 and 1 in each field interval are not constant. As shown in FIG. 2B, gradual increase and gradual decrease are repeated with the lapse of field intervals. As for field 0, the number of field flags decreases from 6 successively to 5, 3 and 1. Subsequently, the number of field flags increases from 1 successively to 4, 6 and 9. Further, the number of field flags decreases from 9 to 7. On the contrary, the number of field flags of field 1 first increases, then decreases and then increases. This change is uniquely defined by the reproduction tape speed.

Since the direction of change in the number of field flags c of field 0 differs from that of field 1, superiority of one of fields 0 and 1 over the other in the number of field flags c is inverted only once without fail in an interval having a fixed change direction. In addition, the repetitive period of change in the number of field flags c of fields 0 and 1 is uniquely defined if the reproduction tape speed is defined. Therefore, the time when the superiority relationship in the number of field flags is inverted (hereafter referred to as the inversion point) is spaced from the time when the number of field flags c of fields 0 and 1 changes from the decreasing direction to the increasing direction or vice versa (hereafter referred to as the change point) by a fixed number of fields depending upon the reproduction tape speed. In case of slow reproduction with a quarter speed, an inversion point is two fields behind a change point.

The write control counter 11 generates the write field selection signal f which is inverted in level at this inversion point. In the write control counter 11, therefore, it is judged on the basis of the field count data e whether the number of field flags c of either of fields 0 and 1 (such as field 0) is in the increase direction or in the decrease direction. Change points in the direction are thus detected. This judgment between the increase direction and the decrease direction can be formed by comparing the numbers of field flags c in two consecutive field intervals. A point of time at which as many fields as determined by the reproduction tape speed have progressed from the change point is defined as an inversion point. The write field selection signal f which is inverted in level at this point of time is generated. In case of slow reproduction with a quarter speed, a point of time at which two field intervals have elapsed from this change point is defined as the inversion point. This time from the change point to the inversion point is set by tape speed information $V_T$ supplied from the input terminal 4. The point of time of level inversion of the write field selection signal f is set at a boundary between field intervals by a field clock CPF supplied from the input terminal 4.

FIG. 2C shows the write field selection signal f. In the same way as the field flag c of FIG. 2A, "H" represents the writing operation of a block of field 0 whereas "L" represents the writing operation of a block of field 1. It is possible to attain the state where the level of the write field selection signal f correctly represents either of fields 0 and 1 having a larger number of field flags c by comparing the number of field flags c of field 0 with that of field 1 at each change point and amending the level of the write field selection signal f if the level is erroneous on the basis of the result of comparison.

As heretofore described, the point of time of level inversion of the write field selection signal f is predicted on the basis of the change point. Despite the fact that the reproduced image signal S, the error flag EF and the ID signal are inputted at the same time, respectively, at the input terminals 1, 2 and 3, and the number of field flags counted by the field sorting counter 10 in each field interval is processed by the write control counter 11, therefore, it is possible to decide at the time of block input whether a block inputted from the input terminal 1 should be written into the frame memory 6 or not.

Together with the field flag c supplied from the field discrimination circuit 9, the write field selection signal f outputted from the write control counter 11 is supplied to the exclusive OR circuit 12. The write gate signal d outputted from this exclusive OR circuit 12 becomes "H" when the write field selection signal f and the field flag c are at identical levels. The write gate signal d becomes "L" when the write field selection signal f and the field flag c are at different levels. When the write permission signal a supplied from the write control circuit 8 is "H", the write gate signal d is inverted in level by the NAND gate 13 and it is supplied to the frame memory 6 as the chip select signal b.

When this select signal b is "L", a block inputted from the input terminal 1 is written into an address of the frame memory 6, which is specified by the write address signal Aw supplied from the write address generator 7.

When the write field selection signal f is "H" to specify field 0 and the field flag c is "H", therefore, the chip select signal b becomes "L" and only blocks included in blocks inputted from the input terminal 1 and belonging to field 0 are written into the frame memory 6. Further, when the write field selection signal f is "L" to specify the field 1 and the field flag c is "L", the chip select signal b becomes "L" and only blocks inputted from the input terminal 1 and belonging to field 1 are written into the frame memory 6.

As described before, the frame memory 6 comprises the field 0 storage area to which blocks of field 0 are written and the field 1 storage area to which blocks of field 1 are written. In case a block supplied from the input terminal 1 is a block of field 0, the write address generator 7 generates a write address signal Aw specifying the pertinent address of the field 0 storage area of the frame memory 6 on the basis of the field ID supplied from the input terminal 3. In case the input block is a block of field 1, the write address generator 7 generates a write address signal Aw specifying the pertinent address of the field 1 storage area of the frame memory 6.

Further, the write control counter 11 generates the read selection signal g which is related to the write field selection signal f by identical timing and level inversion. The read address generator 14 is supplied with the read clock CPR and a clear signal CR from the input terminal 5 and generates a read address signal Ar. In response to the read field selection signal g, the read address signal Ar specifies an address of either of the field 0 storage area and the field 1 storage area included in the frame memory 6.

That is to say, when the write field selection signal f specifies field 0, the read field selection signal g makes the read address generator 14 generate a read address signal Ar specifying addresses of the field 1 storage area of the frame memory 6 in order. When the write field selection signal f specifies field 1, the read field selection signal g makes the read address generator 14 generate a read address signal Ar specifying address of the field 0 storage area of the frame memory in order.

FIG. 2D shows the read field selection signal g. When this read field selection signal g is "H", the read address generator 14 generates a read address signal Ar of the field 0 storage area of the frame memory 6. When the read field selection signal g is "L", the read address generator 14 generates a read address signal Ar of the field 1 storage area of the frame memory 6.

When a writing operation is being conducted in the field 0 storage area of the frame memory 6, the reading operation is repeatedly conducted in the field 1 storage area. Further, when a writing operation is being conducted in the field 1 storage area, the reading operation is repeatedly conducted in the field 0 storage area. Since the write field selection signal f changes the specification of field 0 and 1 storage areas in the frame memory 6 at inversion points where superiority of one of the fields 0 and 1 over the other in the number of field flags is inverted, only blocks of field 0 or field 1 of the same frame are written into the field 0 storage area or the field 1 storage area of the frame memory 6 which is not selected by the write field selection signal f. When contents of this area are repeatedly read out, therefore, blurring is not caused in reproduced images.

The foregoing will now be described by referring to FIGS. 3 and 4. From the scanning trace $S_1$, the scanning intervals of the tracks $T_0(0. 1)$ and $T_0(0. 2)$ become longer. Therefore, the write field selection signal f selects the field 0 storage area of the frame memory. In a succeeding interval during which the rotary drum makes eight revolutions, the writing operation is conducted in this field 0 storage area. During this time, the read field selection signal g selects the field 1 storage area, and the reading operation is repeatedly conducted in this storage area. When the rotating drum begins to make the ninth revolution, the writing operation is conducted in the field 1 storage area, on the contrary, and a repetitive reading operation in the field 0 storage area is started.

Although an embodiment of the present invention has heretofore been described, the present invention is not limited to this embodiment alone.

For example, in the above described embodiment, the field sorting counter 10 counts field flags every field. However, the field sorting counter 10 may count field flags every arbitrary interval such as every frame. It is a matter of course that a memory having an optimum capacity according to this count interval is used instead of the frame memory.

Further, although the write field selection signal f and the read field selection signal g are formed by decision by majority in the number of field flags in each field interval, another method such as a method whereby the writing operation is not conducted at all during a change in accordance with the mixture ratio of the field flags of a certain specific field may also be used.

We claim:

1. A digital image reproduction apparatus for writing reproduced signals obtained from a traveling magnetic tape, at a speed different from that of a recording operation of said signals, into a memory as digital image signals, and simultaneously reading them from said memory, digital image signals being so recorded on said magnetic tape as to extend over n tracks in one field interval, n being a positive integer, said digital image reproduction apparatus comprising:

said memory including a first storage area corresponding to alternate fields or frames of said image signals recorded on said magnetic tape aid a second storage area corresponding to remaining alternate fields of frames;

first means for discriminating a field or frame to which said reproduced signals belong;

second means for selecting either said alternate fields or frames or said remaining alternate fields or frames on the basis of the discrimination result of said first means obtained during each of successive field or frame intervals; and third means for only writing said reproduced signals belonging to a selected field or frame into a specified writing area of said memory to write all of the reproduced signals belonging to said selected field or frame in said specified writing area;

wherein said reproduced signals are divided into unit blocks each provided with an identification signal representing a field or frame to which the unit block belongs; and wherein said second means detects an increase or decrease in the number of said identification signals representing the alternate fields or frames and the remaining alternate fields or frames existing in successive field or frame intervals, and said second means generates a signal which sets a timing for changing over the selection of fields or frames on the basis of change points of said increase or decrease.

2. A digital image reproduction apparatus according to claim 1, wherein said second means selects on the basis of a larger number of fields or frames discriminated from said reproduced signals every field or frame interval.

3. A digital image reproduction apparatus according to claim 2, wherein:

said memory comprises a frame memory including two storage areas each having a storage capacity of one field;

said third means specifies alternately said storage areas of said frame memory as a writing area every interval for reproducing image signals of one field in order to store only reproduced signals belonging to said predetermined field selected by said second means into said frame memory; and read means of said frame memory conducts a reading operation in said storage areas of said frame memory to which reproduced signals are not being written.

4. A digital image reproduction apparatus according to claim 1, wherein said timing for changing over the selection of fields or frames is set according to the traveling speed of said magnetic tape.

5. A digital image reproduction apparatus according to claim 1, wherein:

said memory comprises a frame memory including two storage areas each having a storage capacity of one field;

said third means specifies alternately said storage areas of said frame memory as a writing area every interval for reproducing image signals of one field in order to store only reproduced signals belonging to said predetermined field selected by said second means into said frame memory; and read means of said frame memory conducts a reading operation in said storage areas of said frame memory to which reproduced signals are not being written.

* * * * *